US012292177B1

(12) United States Patent
Mastrangelo

(10) Patent No.: US 12,292,177 B1
(45) Date of Patent: May 6, 2025

(54) VALANCE LIGHTING ASSEMBLY FOR ILLUMINATING SPACES PROXIMATE TO COMMERCIAL EQUIPMENT

(71) Applicant: Promotion Plus Sign Co., Inc., Canoga Park, CA (US)

(72) Inventor: Anthony Mastrangelo, Canoga Park, CA (US)

(73) Assignee: Promotion Plus Sign Co., Inc., Canoga Park, CA (US)

( * ) Notice: Subject to any disclaimer, the term of this patent is extended or adjusted under 35 U.S.C. 154(b) by 0 days.

(21) Appl. No.: 18/764,266

(22) Filed: Jul. 4, 2024

(51) Int. Cl.

| | |
|---|---|
| ***F21V 15/01*** | (2006.01) |
| ***B67D 7/86*** | (2010.01) |
| ***F21S 4/26*** | (2016.01) |
| ***F21V 17/12*** | (2006.01) |
| ***F21V 23/00*** | (2015.01) |
| *F21Y 103/10* | (2016.01) |
| *F21Y 115/10* | (2016.01) |

(52) U.S. Cl.
CPC ................ *F21V 15/01* (2013.01); *B67D 7/86* (2013.01); *F21S 4/26* (2016.01); *F21V 17/12* (2013.01); *F21V 23/009* (2013.01); *F21Y 2103/10* (2016.08); *F21Y 2115/10* (2016.08)

(58) Field of Classification Search
CPC ......... F21W 2131/10; F21W 2131/107; F21W 2131/1005; B67D 7/86; F21V 15/01; F21V 23/009; F21V 17/12; F21S 8/037; F21S 8/033; F21S 4/26; F21Y 2115/10; F21Y 2103/10
See application file for complete search history.

(56) References Cited

U.S. PATENT DOCUMENTS

| | | | | |
|---|---|---|---|---|
| 4,576,312 A * | 3/1986 | Swick, Jr. | B67D 7/06 D15/9.2 |
| 2023/0263919 A1* | 8/2023 | Preisler | B67D 7/86 141/94 |

FOREIGN PATENT DOCUMENTS

| | | | |
|---|---|---|---|
| EP | 1775186 A1 * | 4/2007 | B60S 5/02 |
| EP | 2006246 A1 * | 12/2008 | B67D 7/86 |
| GB | 2242889 A * | 10/1991 | B67D 7/84 |

OTHER PUBLICATIONS

Innovation Q+ NPL Search (Year: 2024).*

* cited by examiner

*Primary Examiner* — Anabel Ton

(57) ABSTRACT

A commercial lighting and lighting display fixture which may include an illumination source disposed in a fixture that may or may not enclose the illumination source element. The result is a display that is both ornamental and serves the function of providing a continuous illumination surrounding the equipment to which it is affixed, through a continuous lighting element disposed between a base and an outer shroud of a valance assembly. The commercial lighting and lighting display fixture may additionally include one or more riser illumination elements mounted to one or more riser panels of the equipment.

20 Claims, 10 Drawing Sheets

VALANCE LIGHTING ASSEMBLY FOR ILLUMINATING SPACES PROXIMATE TO COMMERCIAL EQUIPMENT

BACKGROUND OF THE INVENTION

Field of the Invention

The present disclosure relates generally to commercial lighting and, more particularly, commercial lighting utilized in deploying exterior dispenser equipment, including, but not limited to, fuel dispensers, air/water dispensers, charging units, and additional freestanding or affixed-to structure appliances.

Description of the Related Art

Commercial retail establishments frequently combine signage, architectural design, and lighting to enhance their businesses and brand identity. Ideally, these establishments aim to integrate these elements in a way that not only attracts consumers but also ensures proper illumination for the safety of their customers. However, fuel stations, which dispense gasoline, diesel, natural gas, hydrogen, etc., have not evolved their lighting systems at the same pace as other establishments. This is in part due to stringent laws and regulations which frequently restrict the types of signage and lighting these types of businesses can employ. Moreover, outdated lighting systems, can produce undesirable results. Outdated systems including those utilizing individually modular light emitting diodes (LEDs), can produce an uneven and attenuated light distribution, and other forms of ornamental illumination can result in excessively large or unsightly fixtures which can create light pollution and disrupt the local environment.

SUMMARY OF THE INVENTION

Various embodiments of a valance lighting assembly for illuminating an area proximate to commercial equipment are described herein. In one embodiment, the valance lighting assembly comprises a dispenser structure configured as a support substrate for receiving the valance lighting assembly; a base including one or more base panels defining a two-dimensionally-enclosed frame structure and configured to be removably coupled to the dispenser structure; a continuous illumination element coupled to and extending along a width of an exterior face of at least some of the one or more base panels in a predetermined contour; and an outer shroud including one or more valance panels arranged to partially cover the base by extending longitudinally parallel to the at least some of the one or more base panels at a predetermined offset depth from the exterior face, thereby creating a cavity between the exterior face and the one or more valance panels. A line defining a first end of the one or more valance panels follows a shape of the predetermined contour, and the continuous illumination element is recessed within the cavity and utilizes the exterior face of the at least some of the one or more base panels to reflect light to the area proximate to the commercial equipment.

In another embodiment, the valance lighting assembly includes a riser assembly, comprising one or more riser stripes affixed to an external side of one or more vertically-extending riser panels of the commercial equipment; and one or more riser illumination elements partially disposed within a channel formed vertically along a height of the one or more riser stripes. A light-emitting portion of the one or more riser illumination elements partially protrudes above a face of the riser stripe to omnidirectionally direct light to the area proximate the commercial equipment.

The foregoing summary has been provided to introduce a selection of concepts in a simplified form that are further described below in the detailed description. The summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
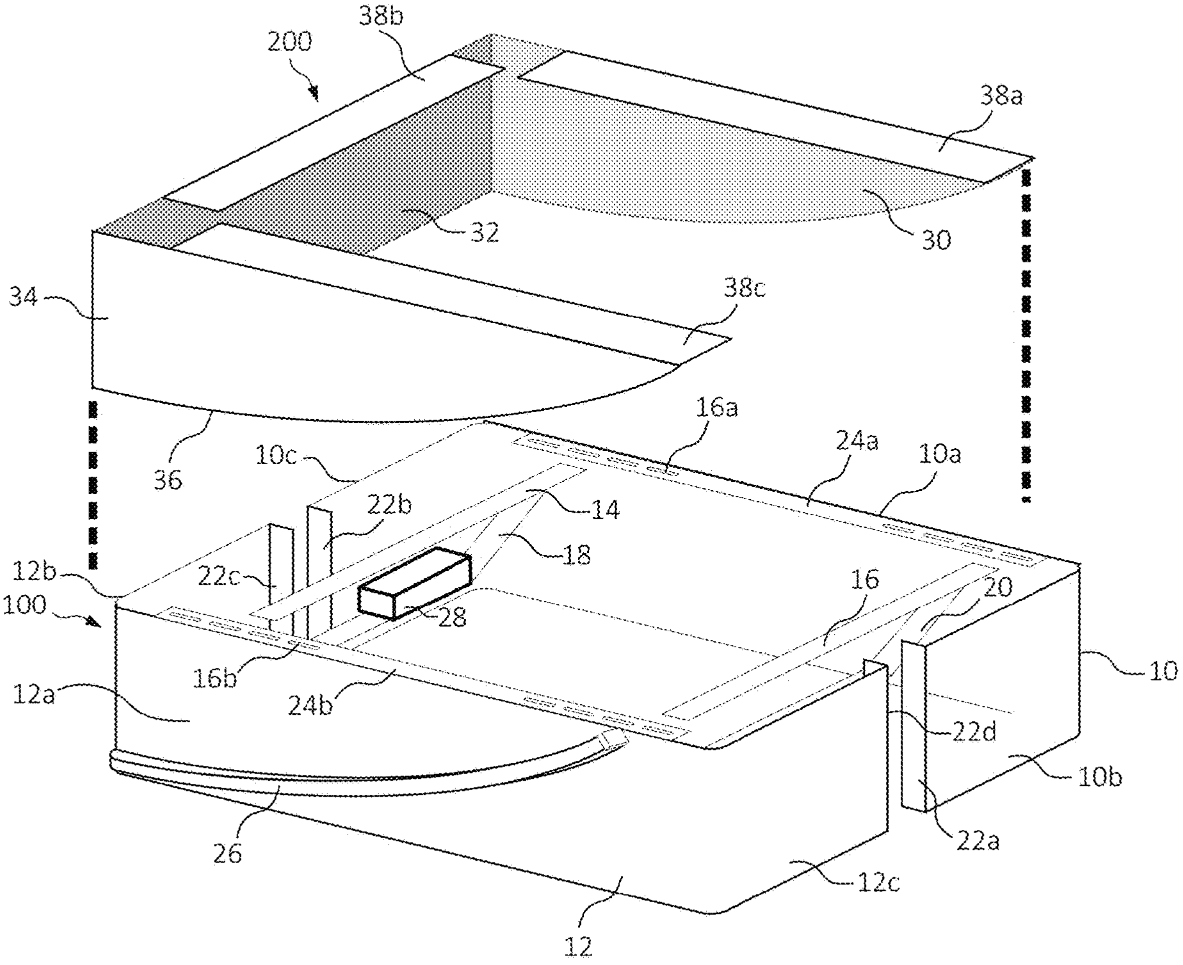
FIG. 1 is a perspective view illustration of a valance lighting assembly, as disassembled, according to one embodiment of the present invention.
Figure 2:
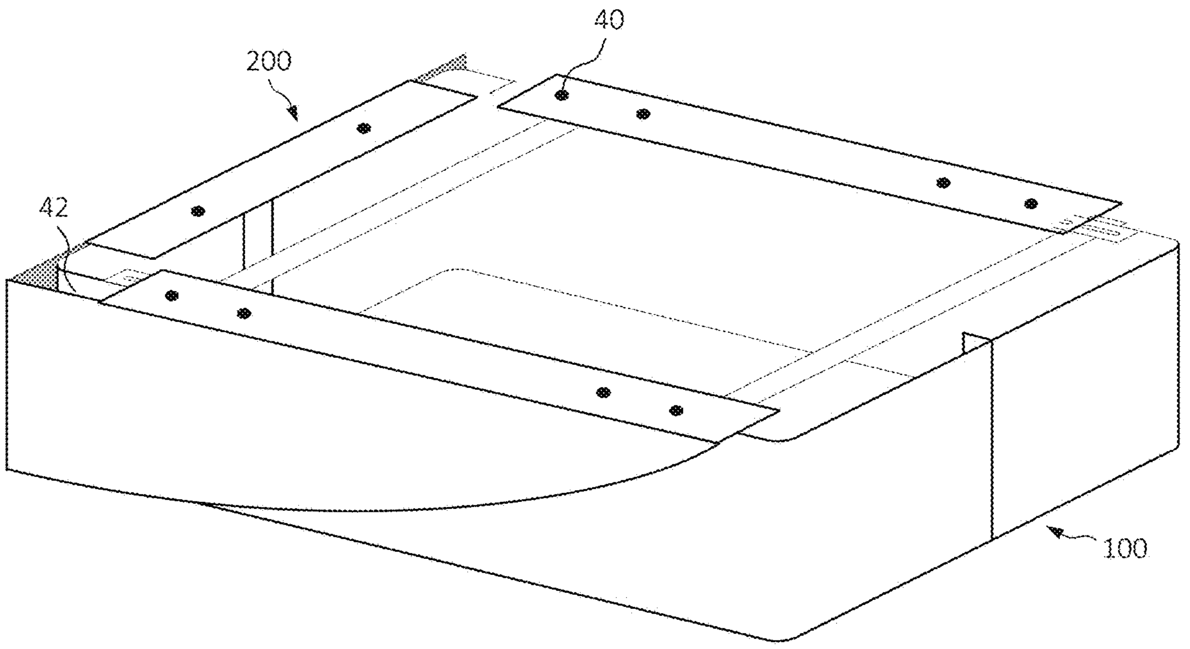
FIG. 2 is a perspective view illustration of the valance lighting assembly, as assembled, according to one embodiment of the present invention.
Figure 3:
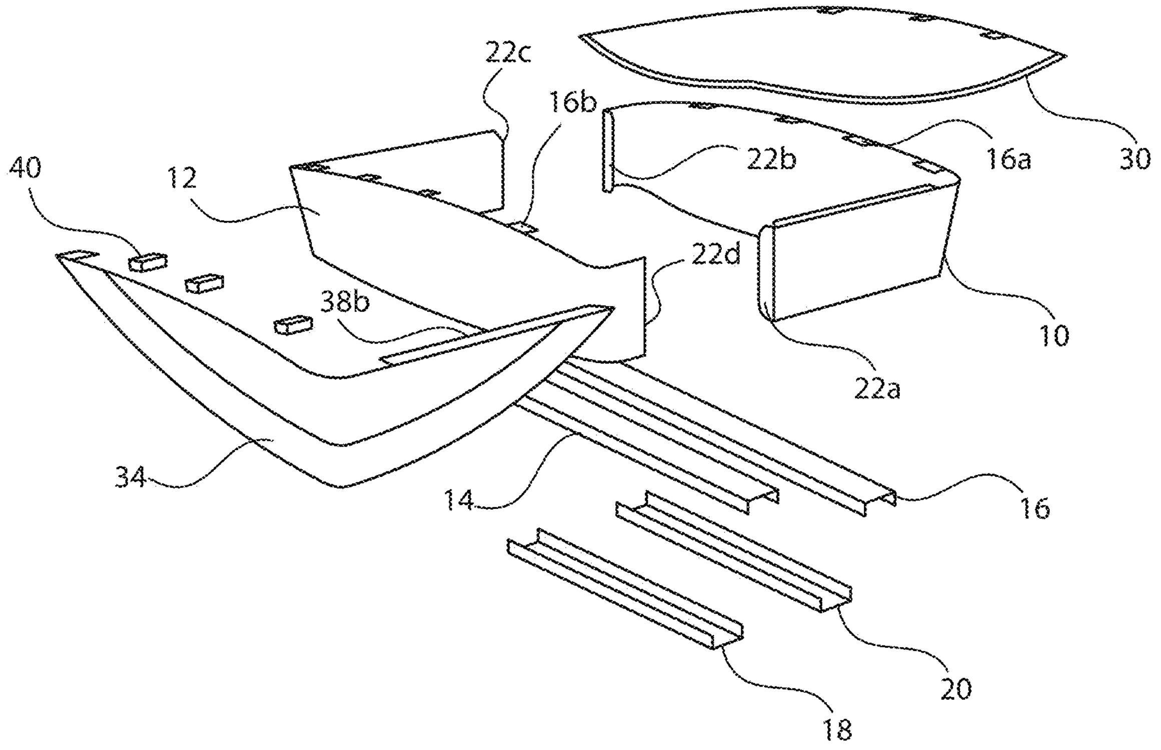
FIG. 3 is a perspective view illustration of an alternative configuration of the valance lighting assembly, as disassembled, according to one embodiment of the present invention.
Figure 4:
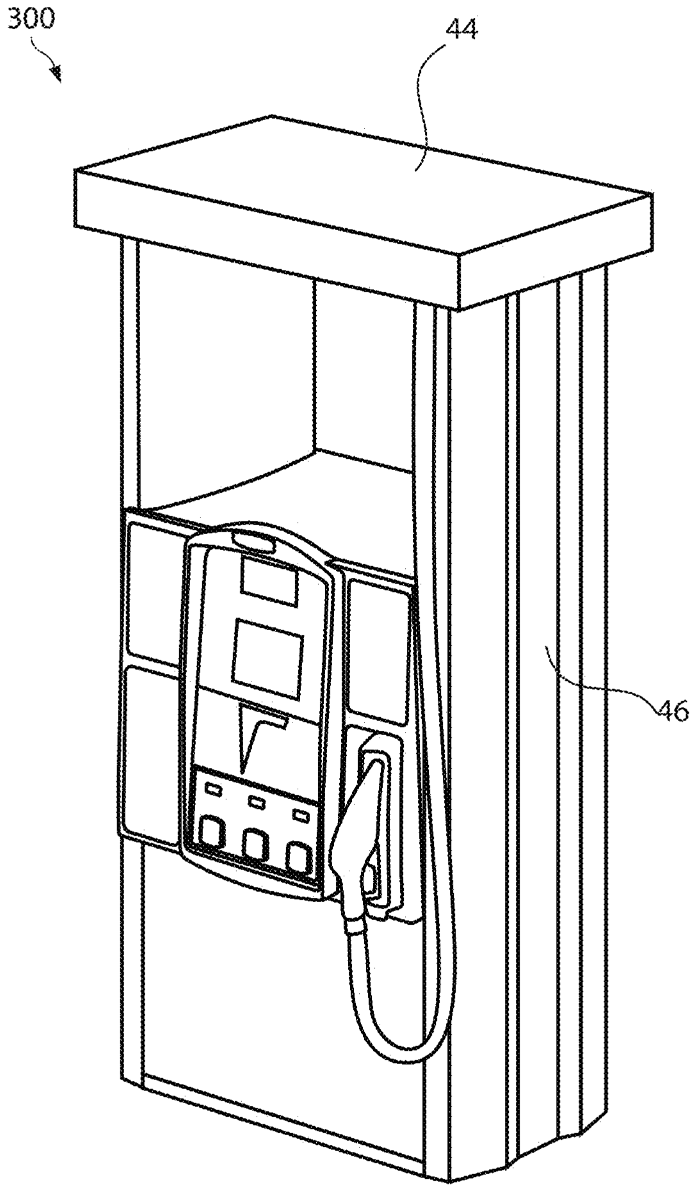
FIG. 4 is a perspective view illustration of a fuel dispenser for mounting the valance lighting assembly, according to one embodiment of the present invention.

The following detailed description of the invention merely provides exemplary embodiments and is not intended to limit the invention of the application and uses of the invention. Furthermore, there is no intention to be bound by any theory presented in the preceding background of the invention of the following detailed description of the invention.

Fuel dispensers (also referred to herein simply as "dispenser"), commonly found at fuel stations ("gas stations"), are specialized machines designed for the distribution of various types of fuel, such as gasoline, diesel, natural gas, and hydrogen, into vehicles or containers. In the modern era, fuel dispensers have undergone significant innovation, including the introduction of digital displays, automated payment systems, and advanced features such as touch-screen interfaces and compatibility with mobile payment platforms.

However, one area where fuel dispensers, and fuel stations in general, have not seen significant change or innovation is in lighting systems and technology utilized to illuminate areas proximate to the dispenser. Such lighting systems serve not only to attract consumers through company displays and branding, but also to ensure adequate illumination of the area surrounding the dispenser, particularly when consumers are engaging with equipment that by its very nature requires care in handling to operate safely. To advance upon the art, ensure proper illumination in the area surrounding the dispenser for consumer safety, and provide an elegant representation of the establishment maintaining the dispenser, an improved valance and riser lighting assembly for mounting on fuel dispensers is disclosed herein.

It should be noted, however, that while the following description generally references commercial lighting with respect to fuel dispensers and fuel stations, the apparatus and components thereof are not limited to such embodiments. For example, the described assemblies are adaptable to other commercial establishments and equipment, such as air/water dispensers, charging units (e.g., for electric vehicles), and additional freestanding or affixed-to structure appliances.

Turning now to the drawings, and particularly FIGS. 1-6, an example of a valance lighting assembly (also referred to herein more simply as "valance") is illustrated. In one embodiment, the valance includes a base 100, which defines the primary structure of the assembly. The base 100 is generally a box-shaped structure and composed of one or more base panels defining a two-dimensionally-enclosed frame configured to be removably coupled to a structure of a fuel dispenser. In the instant example, the base 100 is composed of base panels 10 and 12. Each base panel 10, 12 is formed of a single panel of substantially planar and rigid yet pliable material, such as a sheet of aluminum, other metal or metal alloy, which is able to maintain an applied shape under outdoor weather conditions.

As depicted, base panel 10 is constructed as a monolithic aluminum panel formed into an open-bracket shape consisting of a longitudinally-oriented elongated side 10*a*, and having symmetrical, 90 degree curvatures applied mid-length from either panel end to create a leg 10*b* on a first end of the base panel 10, and a leg 10*c* on a second end of the panel, opposite the first end. Base panel 12 is similarly constructed as a monolithic aluminum panel formed into an open-bracket (symmetrically-opposing) shape consisting of a longitudinally-oriented elongated side 12*a*, and having symmetrical, 90 degree curvatures applied mid-length from either panel end to create a leg 12*b* on a first end of the base panel 12, and a leg 10*c* on a second end of the panel, opposite the first end. In one embodiment, the base 100 consisting of base panels 10, 12, may be constructed to form a square box-structure (see FIG. 1), and in another embodiment, the base consisting of base panels 10, 12 may be constructed to form a more rounded box-structure (see FIG. 3). In a further embodiment, the base 100 may be constructed to form a circular or oval structure, having the same components as those described herein.

Each of the base panels 10, 12 further include a vertical flanges 22*a-d* formed from curving the material of the respective panel at a perpendicular (90 degree) angle short (e.g., 1 inch) of each of the first end and the second end, such that each vertical flange extends inward toward an interior of the base 100. That is, base panel 10 includes two vertical flanges 22, a first flange 22*a* formed from a section of the leg 10*b* on the first end of the panel and a second flange 22*b* formed from a section of the leg 10*c* on the second end of the base panel 10. Similarly, base panel 12 includes two vertical flanges 22, a first flange 22*c* formed from a section of the leg 12*b* on the first end of the panel and a second flange 22*d* formed from a section of the leg 12*c* on the second end of the base panel 12.

The base 100 is thus formed when base panel 10 is coupled in a horizontal orientation to the symmetrically-opposing base panel 12 having the vertical flange 22*a* of the base panel 10 aligned with the vertical flange 22*d* of base panel 12, such that the leg 10*b* of the base panel 10 is flush with the leg 12*c* of the base panel 12 to form the appearance of a continuous panel. Similarly, the vertical flange 22*b* of the base panel 10 is aligned with the vertical flange 22*c* of base panel 12, such that the leg 10*c* of the base panel 10 is flush with the leg 12*b* of the base panel 12 to form the appearance of a continuous panel.

In one embodiment, the vertical flanges 22*a* and 22*b* of base panel 10 are coupled to the symmetrically-opposing vertical flanges 22*c* and 22*d* of base panel 12 utilizing fasteners 40 disposed through apertures (holes) formed through each opposing tab at a desired positioning in the tabs. That is, the number of and positioning of the fasteners 40 may vary depending on the implementation, yet should be selected with care to ensure a seamless and strong coupling of the base panel 10 to base panel 12 to thereby provide an impression of a single and continuous base. The fasteners 40 may comprise any suitable fastener capable of maintaining a firm coupling between the base panels 10, 12, such as nut and bolt, screw or self-tapping screw, rivet, etc. In another embodiment, the vertical flanges 22*a* and 22*b* of base panel 10 are materially-joined or welded to the symmetrically-opposing vertical flanges 22*c* and 22*d* of base panel 12.

Base panel 10 further includes a mounting angle 24*a* defining a flap portion of material extending at least some (or all) of the length of its elongated side 10*a*, positioned perpendicularly inward toward the interior of the base 100 and configured to be substantially flush and planar with the top side of the base panel 10. Base panel 12 similarly includes a mounting angle 24*b* defining a flap portion of material extending at least some (or all) of the length of its elongated side 12*a*, positioned perpendicularly inward toward the interior of the base 100, and configured to be substantially flush and planar with the top side of the base panel 12. The mounting angles 24*a*, 24*b* may each be formed, in one embodiment, by folding an extended portion of material utilized to construct the top sides of base panels 10, 12, inward at the perpendicular (90 degree) angle and flush with the top of the base 100. In another embodiment, the mounting angles 24*a*, 24*b* may be added to the base panels 10, 12 subsequent to their formation by materially-joining or welding the flap portion of the mounting angles 24*a*, 24*b* at the top side of each respective panel. In the depicted configuration, mounting angles 24*a*, 24*b* are constructed of the same material and having a substantially similar thickness as base panels 10, 12, however this is not a limitation.

The mounting angles 24*a*, 24*b* each further include mounting apertures 16*a*, 16*b* disposed at predetermined width intervals extending along a length of the mounting angles 24*a*, 24*b* as necessary to engage fasteners 40 to secure the base 100 to the remaining portion of the assembly, which will be further described.

In the depicted configuration, the base 100 is constructed as an open-frame or open-box structure in which only the base panels 10, 12 define the horizontally-oriented longitudinal exterior of the box. Thus defines a vertical cavity disposed substantially through a horizontal top-side and horizontal bottom-side of the base 100 at its longitudinal axis such that, when mounted, wind, rain or other elements are able to pass through the interior thereof. To provide structural rigidity to the base 100, the base 100 includes cross-bars 14, 16 affixed at predetermined width intervals between the base panel 10 and base panel 12. In such a configuration, cross-bars 14, 16 are positioned horizontally between the base panels 10, 12 at a section along the top and perpendicular to each respective elongated side 10*a*, 10*b* of each base panel 10, 12. The cross-bars 14, 16 may be composed of rigid strapping, panel or angle material in a form and thickness which disallows the cross-bars 14, 16 from buckling under load of outdoor elements. In one example, the cross-bars 14, 16 may be composed of the same aluminum of the base panels 10, 12, or in another metal or metal alloy.

In some embodiments (not shown), additional cross-bars may be added to the base 100, depending on the implementation and requirements to attach the base 100 to a substrate. For example, a cross-bar may be added to extend a horizontal width of the base 100 and positioned to engage the vertical flanges 22*a*, 22*d* to vertical flanges 22*b*, 22*c* at a desired vertical height (or flush at the top) along the interior of the base 100. In some embodiments, one or more additional cross-bars may be added to crisscross the interior of the base 100 by coupling a first corner of the base panel 10 to an opposite and opposing corner of base panel 12 and vice versa (e.g., from leg 12*c* to leg 10*c*, and leg 12*b* to leg 10*b*). These additional cross-bars may similarly be constructed in a similar shape and utilizing substantially the same material as cross-bars 14, 16, or in another desirable shape and material as necessary for the implementation.

In the depicted configuration, the base 100 further includes angle brackets 18 and 20, which may be constructed of rigid strapping or panel material of that of cross-bars 14, 16, and positioned to be similarly affixed at predetermined width intervals between the base panel 10 and base panel 12. Angle bracket 18, for example, may be constructed on an elongated and rigid strapping or panel material at which a first end is coupled to a section of the elongated side 10*a* of base panel 10 and having a first angled section extending downward at a predetermined angle toward an interior of the base 100. The first angled section may then join a planar section extending parallel to the bottom of the base 100, which terminates in a second angled section extending upward toward the top of the base 100 at a second predetermined angle, inverse to the first predetermined angle, to a second end of the angle bracket 18 engaging a section of the elongated side 12*a* of base panel 12.

Similarly, angle bracket 20 may mirror the angle bracket 18, at which a first end is coupled to a second section of the elongated side 10*a* of base panel 10 and having a first angled section extending downward at a predetermined angle toward an interior of the base 100. The first angled section may then join a planar section extending parallel to the bottom of the base 100, which terminates in a second angled section extending upward toward the top of the base 100 at a second predetermined angle, inverse to the first predetermined angle, to a second end of the angle bracket 18 engaging a second section of the elongated side 12*a* of base panel 12.

In some embodiments, the cross-bar 14 and the angle bracket 18 (and similarly the cross-bar 16 and the angle bracket 20) may be constructed to be a singular unit. That is, the first end of the angle bracket 18 may engage a first end of the cross-bar 14, and the first angled section, the planar section, and the second angled section of the angle bracket 18 may extend directly underneath the cross-bar 14 such that the second end of the angle bracket 18 engages with the second end of the cross-bar 14. In any case, the angle brackets 18, 20 may each have formed apertures within their respective planar sections for which fasteners 40 may be utilized to mount the base 100 to a structure of a fuel dispenser 300.

In the depicted configuration, the structure of the fuel dispenser 300 utilized to mount the base 100 thereto is a dispenser bonnet 44. In an embodiment, the dispenser bonnet 44 is an enclosed-box structure positioned atop the fuel dispenser 300 and is constructed from rigid paneling material similar to that of the base 100. This dispenser bonnet 44 may also be referred to as a topper or canopy (although not to be conflated with a structural canopy of the fuel station), and are generally part of the pump housing and utilized to protect mechanical components of the fuel dispenser 300. It should be noted that the fuel dispenser 300 is pre-existing to the construction of the valance, and therefore the depicted dispenser bonnet 44 is pre-existing as part of the dispenser 300. Accordingly, the dispenser bonnet 44 may be formed of material dissimilar to the base 100, may take an entirely different form than the enclosed-box structure depicted in FIG. 3, for example, or may not even exist (i.e., in implementations where the fuel dispenser 300 does not include the dispenser bonnet 44).

Assuming the fuel dispenser 300 includes the dispenser bonnet 44, the respective planar sections of the angle brackets 18, 20 of the base 100 are configured to parallelly meet and rest a top a horizontally planar section of a top side of the dispenser bonnet 44. Fasteners 40 may then be driven through the apertures formed in the angle brackets 18, 20, and further through apertures formed through the dispenser bonnet 44, to couple the angle brackets 18, 20 (and therefore the base 100) to the dispenser bonnet 44. As previously mentioned, any type of hardened fastener adequate to hold a weight of the base 100 to the dispenser bonnet 44 is considered, including but not limited to nut and bolt, screw, rivet, etc.

In one embodiment, the base 100 is mounted, by way of angle brackets 18, 20, atop the dispenser bonnet 44 in such a way as to symmetrically and entirely cover the dispenser bonnet 44 when viewed from a horizontal perspective. That is, base panels 10, 12 are each formed to have a vertical width wider than a width of the vertically exterior sides of the dispenser bonnet 44 such that, when mounted, the vertically exterior sides of the dispenser bonnet 44 are disposed within the base 100. Similarly, and depending on the implementation, a length of the first and second angled sections of the mounting angle bracket 18, 20 may be extended or shortened to adjust a depth at which the base 100 covers the dispenser bonnet 44 when mounted.

In implementations where the fuel dispenser 300 does not include a dispenser bonnet 44, a bracket may be constructed as necessary on the fuel dispenser 300 for mounting the base 100 by way of the angle brackets 18, 20. In some configurations, additional bracketing or hardware may be required within the base 100 as necessary to mount the base 100 atop the fuel dispenser 300, and is not a limitation of the present invention.

The base 100 includes a continuous lighting element 26 which is coupled to and extends at least partially along at least some of the width of one or more exterior sides of the base 100. For example, the continuous lighting element 26 may extend along a shortened width of the elongated side 10*a* of base panel 10 (as opposed to a full width of the elongated side 10*a* of base panel 10), further curving along a first corner of the leg 10*c* of base panel 10, extending along the leg 10*c* of base panel 10 to the leg 12*b* of base panel 12, curving along a first corner of the leg 12*c* of base panel 12, and extending along at least some of the width of the elongated side 12*a* of base panel 12. An installed length of the continuous lighting element 26 will ultimately vary depending on the implementation, and commensurate with which portions of which sides of base panels 10, 12 the continuous lighting element 26 is coupled thereto.

In some embodiments, the continuous lighting element 26 only extends laterally from the vertical bottom of either base panel 10, 12 to the vertical top of base panel 10, 12 in a stylized configuration. In further embodiments, an additional continuous lighting element may be present and affixed between the base 100 and follow a like predetermined contour.

In one embodiment, the continuous lighting element 26 comprises a traditional neon light, a neon rope light, or neon-style LED rope light. Neon rope lights, or neon-style rope lights use LEDs to generate illumination. These LEDs are mounted on a flexible circuit board and enclosed within a protective casing, typically made of silicone or polyvinyl chloride (PVC), and may include a backing 48 which is coupled to the base 100. When connected to a power supply such as that provided in electronics module 28, usually a low-voltage direct current (DC) source, electricity flows through the LEDs, causing them to emit light through a lens 26 by way of an LED driver. The electronics module 28 may be disposed in a location hidden from external view, such as coupled to angle bracket 18.

In some implementations, the continuous lighting element 26 may include a phosphor coating on the LEDs or lens 26 to diffuse the light and create a uniform glow reminiscent of traditional neon lighting. The LEDs are arranged closely together along the length of the continuous lighting element 26, producing a continuous strip of illumination. The continuous lighting element 26 utilized in the considered invention is able to produce light in various colors, achieved through different combinations of LED chips and phosphor coatings, with capabilities for dynamic lighting effects.

A distinct feature of the present invention is a predetermined contour, or shape, of a line the continuous lighting element 26 forms as it extends along its path on the exterior of the base panels 10, 12. In the depicted configuration, the continuous lighting elements 26 begins mid-width at a top of the elongated side 12*a* of base panel 12, curves downward in a two-dimensional plane as it continues along a radius of the first corner of the base panel 12 and onto the conjoined side of base panels 10, 12, and (although not shown) mirrors this contour as it continues along a radius of the second corner of base panel 12 and extends upward in a similar fashion until its termination mid-width at the top of base panel 10. Accordingly, in the depicted example, the continuous lighting element 26 is contoured in the general shape of a parabola against the two-dimensional planar sections of the base 100.

However, the length and positioning of the continuous lighting element 26 may differ from implementation to implementation, according to specified design requirements. For example, as referenced previously, the continuous lighting element 26 may be coupled to and extend only on a single side of the base 100, for example, the elongated side of base panel 12. In another configuration, the continuous lighting element 26 may be coupled to and extend an entire horizontal dimension of the base 100. In yet another configuration, two or more continuous lighting elements 26 may be coupled to the base 100 at opposing sides, and the like.

Figure 5:
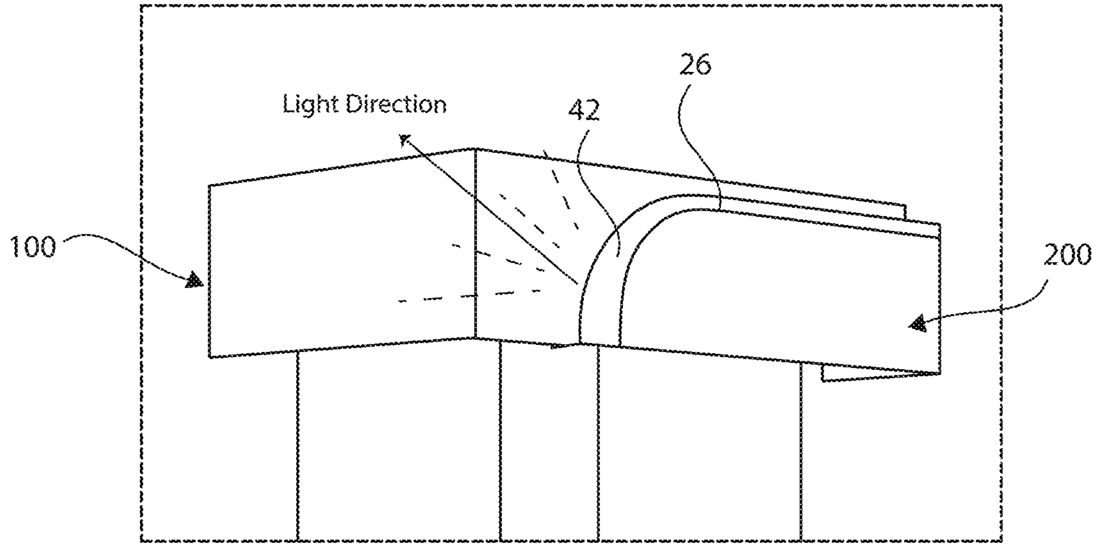
FIG. 5 is a perspective view illustration of mounting configurations of the valance lighting assembly, according to one embodiment of the present invention.
Figure 5:
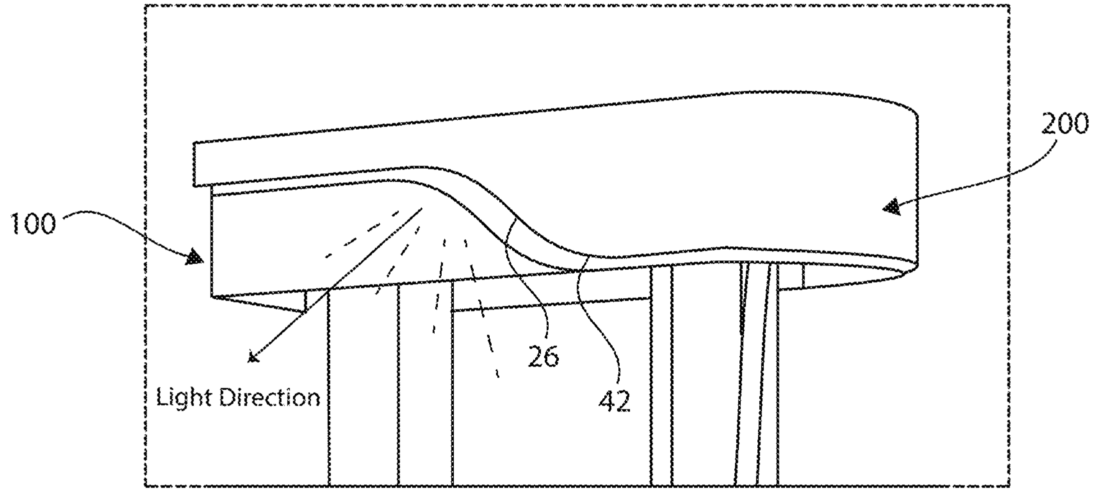
Figure 6:
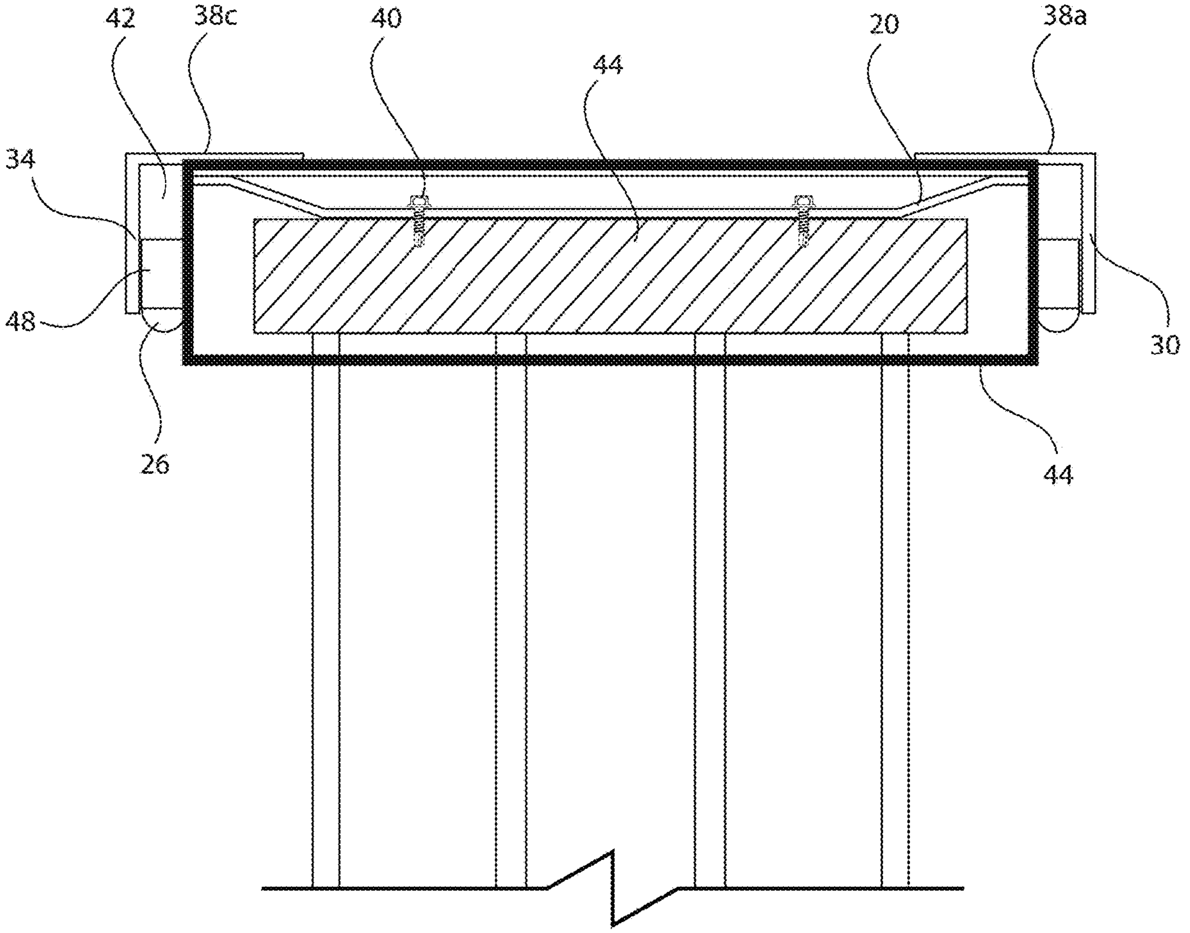
FIG. 6 is a cross-sectional view illustration of the valance lighting assembly, according to one embodiment of the present invention.
Figure 7A:
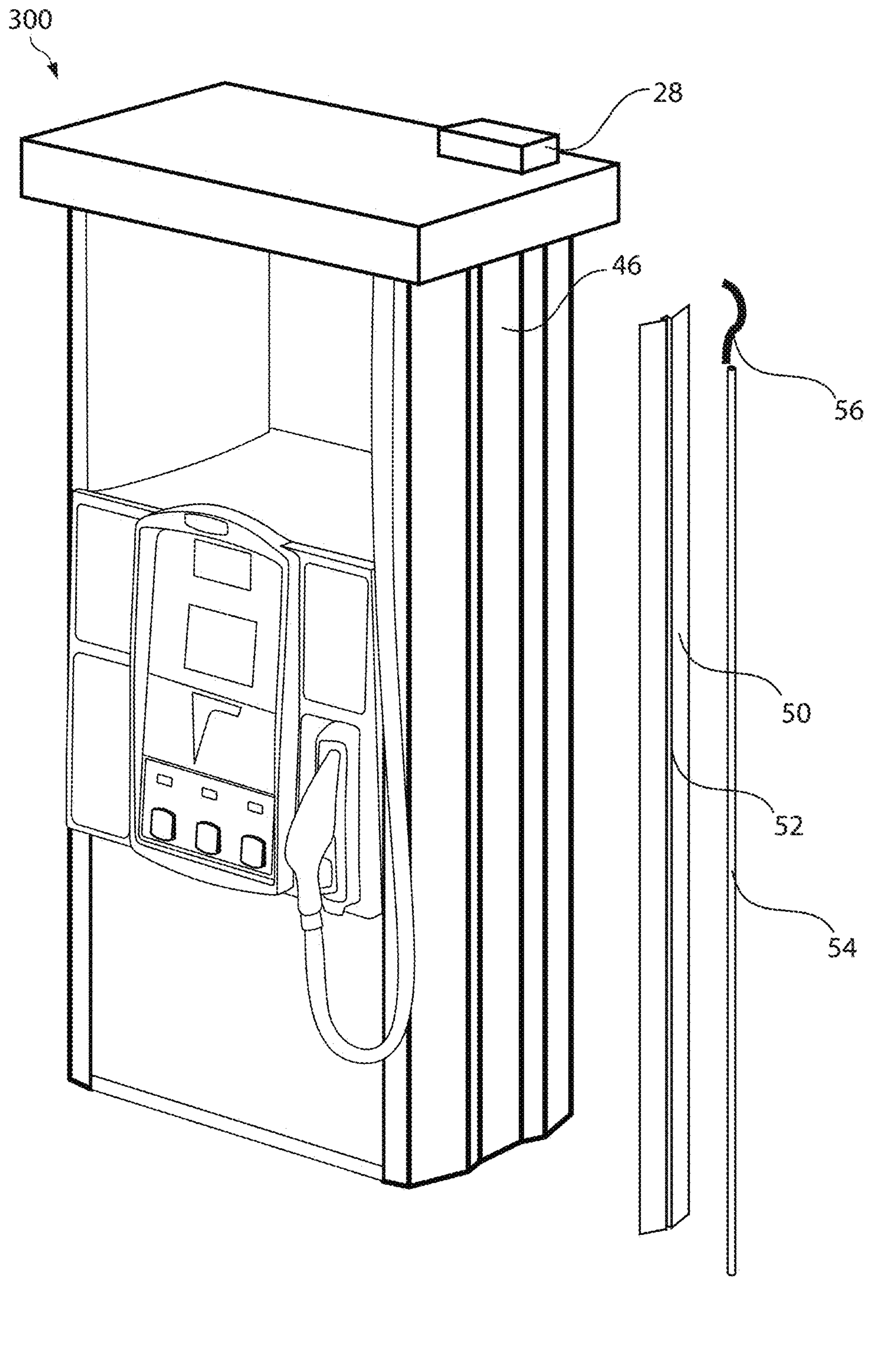
FIGS. 7A and 7B are perspective view illustrations of the fuel dispenser with a riser assembly, according to one embodiment of the present invention.
Figure 7B:
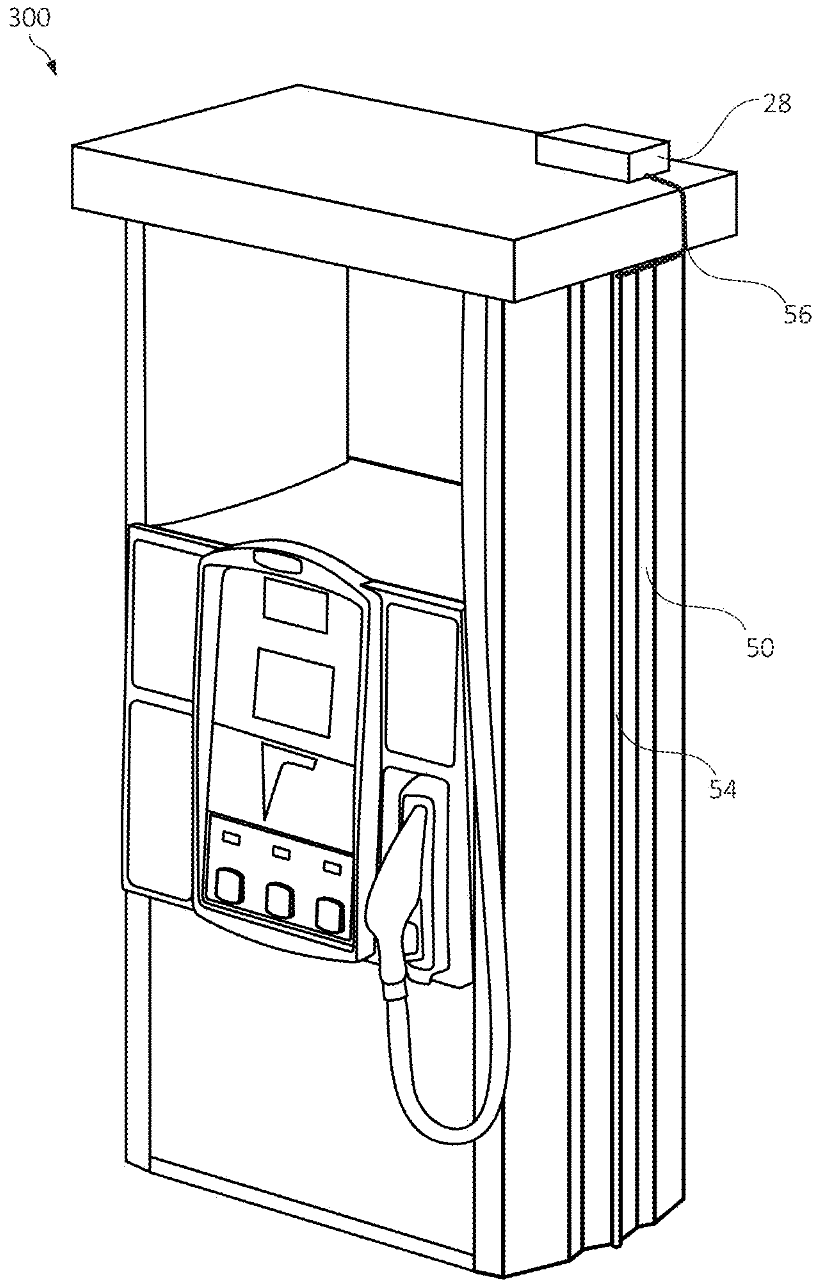

Further, the predetermined contour (shape) of the continuous lighting element 26 may take any form. In one implementation, the predetermined contour of the continuous lighting element 26 is a flat, horizontal line along a width and/or depth of the base 100. In another implementation, the predetermined contour may take an "S" shape as the continuous lighting element 26 extends along the width of the base panels 10, 12 of the base 100. To wit, any length of any shape or contour of any number of strips of the continuous lighting element 26 coupled to the base 100 is considered within the scope of the present invention. In additional embodiments, as depicted in FIG. 5, the light of the continuous lighting element 26 may be directed upward, or downward according to the positioning of an outer shroud 200 now discussed.

The valance assembly is complete with the installation of the outer shroud 200 to the base 100. The outer shroud 200 is composed of one or more valance panels constructed of one or more planar sheets of a similar metal or metal alloy as that of the base 100. In the depicted configuration, the outer shroud 200 comprises a single panel of substantially planar and rigid yet pliable material formed into three panel sides, namely panel side 30, panel side 32 and panel side 34. However, in other embodiments (see FIG. 3), two valence panels 30 and 34 (or any additional combination of valence panels) may be implemented, according to the ornamental design being utilized.

In one depicted example, panel side 30, 32, and 34 each include a mounting flap extending perpendicular from a top end and inwardly toward an inner portion of the base 100 to mount the outer shroud 200 to the base 100. That is, panel side 30, at a vertically top end, includes a mounting flap 38*a* of material which has been folded over inwardly toward the base 100 to engage the mounting flap 38*a* to the mounting angle 24*a* of base panel 10 through fasteners 40 disposed through apertures in the mounting flap 38*a* and the mounting angle 24*a*. Similarly, panel side 32, at a vertically top end, includes a mounting flap 38*b* of material which has been folded over inwardly toward the base 100 to engage the mounting flap 38*b* to either the cross-bar 14 or another mounting angle (not shown) of base panel 10 through fasteners 40 disposed through apertures formed therethrough. Similarly, panel side 34, at a vertically top end, includes a mounting flap 38*c* of material which has been folded over inwardly toward the base 100 to engage the mounting flap 38*c* to the mounting angle 24*b* of base panel 10 through fasteners 40 disposed through apertures in the mounting flap 38*c* and the mounting angle 24*b*.

When assembled and the outer shroud 200 is mounted over the base 100, the panel sides 30, 32, and 34 are offset from the exterior face of the base panels 10, 12 by a predetermined offset depth 42, forming a cavity between an interior face of the panel sides 30, 32, and 34, and the exterior face of the base panels 10, 12. As the outer shroud 200 is lowered onto the base 100, the continuous illumination element 26 is disposed within this cavity created by the offset depth 42, which in one embodiment, is no deeper than twice a depth of the backing 48 of the continuous illumination element 26. However, this offset depth may again be suited toward the particular implementation.

In the depicted configuration, the panel side 32 is substantially the same shape as the conjoined side of base panels 10, 12, at a width slightly wider than the conjoined side of base panels 10, 12 to allow for the offset depth 42. Although flush with a top side of the base 100, panel side 32 has a reduced height as compared to the height of each of the base panels 10, 12, such that an additional height offset is formed on the vertically bottom end of panel side 32 as the outer shroud 200 is coupled to the base 100. This allows the continuous lighting element 26 to, in effect, not only provide illumination from its lens but also reflect light off of material forming the cavity of the offset depth 42 between the valance and the exterior face of base panels 10, 12 to an intended area of illumination proximate the fuel dispenser 300.

Panel sides 30, 34, or a top end of panel sides 30, 34, are also substantially flush with a top side of the base 100 when assembled. However, a vertically bottom end of panel side 30 is formed in such a way that a line defining the bottom end of panel side 30 follows a shape of the predetermined contour the continuous illumination element 26 creates as it extends along the base 100. Similarly, a vertically bottom end of panel side 34 is formed in such a way that a line defining the bottom end of panel side 34 additionally follows a shape of the predetermined contour the continuous illumination element 26 creates as it extends along the base 100. In other words, while a first, vertically top-end of each panel side 30, 32, 34 of the outer shroud 200 is mounted flush to a top side of the base 100, a second, vertically bottom end of each panel side 30, 32, 34 is formed in a shape that follows the predetermined contour of the continuous illumination element 26. Therefore, in operation, the continuous lighting element 26—notwithstanding what two-dimensional shape it defines as it extends along the base 100—is housed directly under and proximate to a vertically-bottom end of each panel side 30, 32, 34 of each valance panel.

It should be noted that, while the depicted configuration illustrates the outer shroud 200 mounted atop the base 100 with the intended area of illumination around and below the valance among the fuel dispenser 300 below, many other configurations are considered and exist. For example, as discussed, the outer shroud 200 may be mounted on bottom of the base 100 to direct light upward by reflecting the light from the continuous lighting element 26 off the material forming the cavity between the base 100 and the valance panels 30, 32, 34. Further, while the base 100 and the outer shroud 200 are depicted to be substantially box-shaped, this is not a limitation. For example, the valance assembly may take a more circular or oval shape, and thus the base 100 and/or the outer shroud 200 may be formed in an attendant manner.

Turning now to FIGS. 7A-9, the lighting assembly of the present invention may further comprise a riser assembly affixed to a vertical side of the fuel dispenser 300. The riser assembly may include a vertically-extending riser panel 46 which is pre-existing to the fuel dispenser 300. A vertically-extending riser stripe 50 may be coupled to the riser panel 46 by way of one or more fasteners 60 driven into the riser panel 46 through apertures in a decorative channel 52 in the riser stripe 50, at desired intervals. The riser stripe 50 may further be coupled to the riser panel 46 of the fuel dispenser 300 by way of mounting hardware 62*a*, 62*b* fastened to an interior side of either horizontal end of the riser strip 50 and coupled to the riser panel 46.

In some embodiments, this additional hardware may include industrial glue or tape, or additional hardware fasteners.

Figure 8:
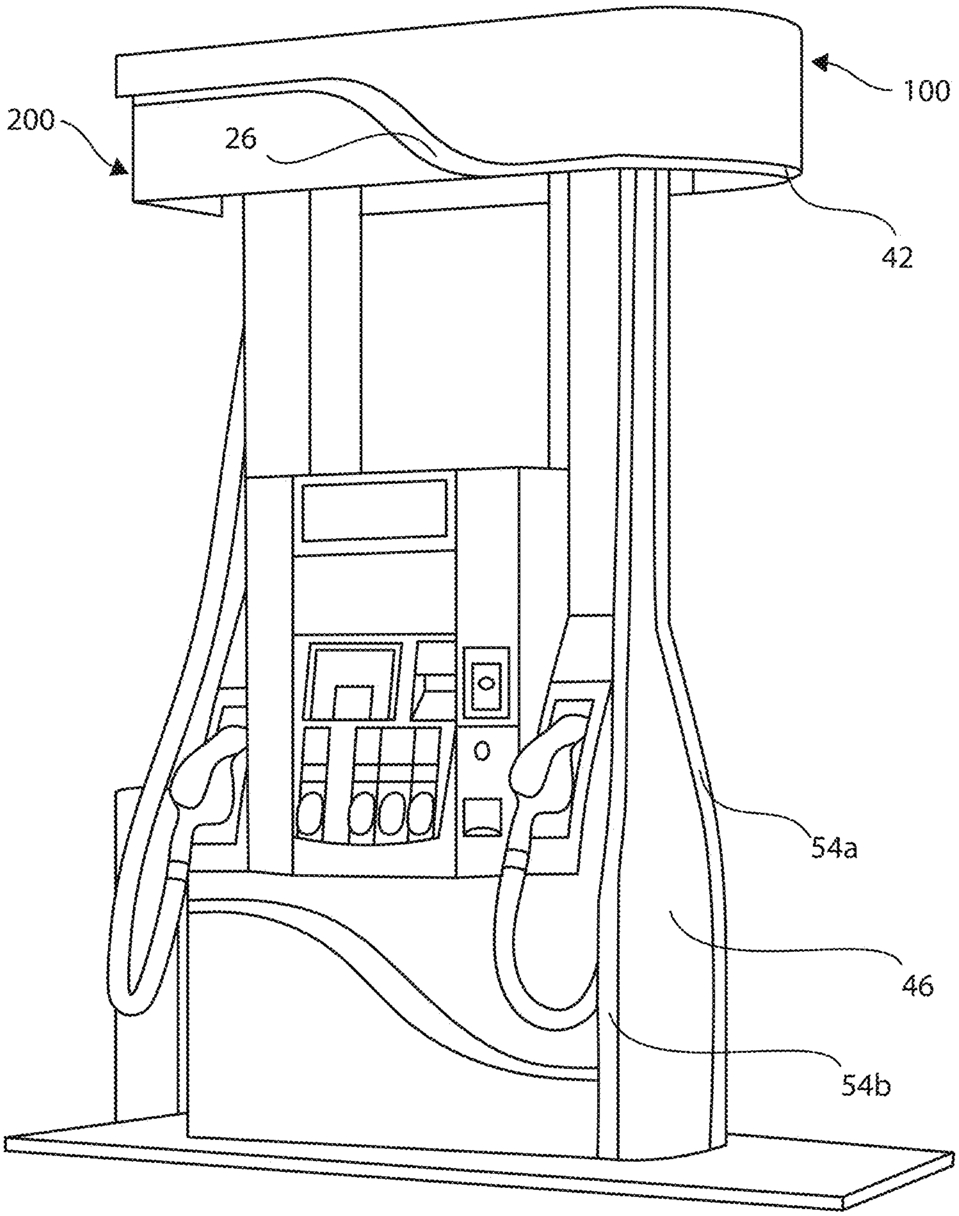
FIG. 8 is a perspective view illustration of the fuel dispenser with an alternative configuration of the riser assembly, according to one embodiment of the present invention.
Figure 9:
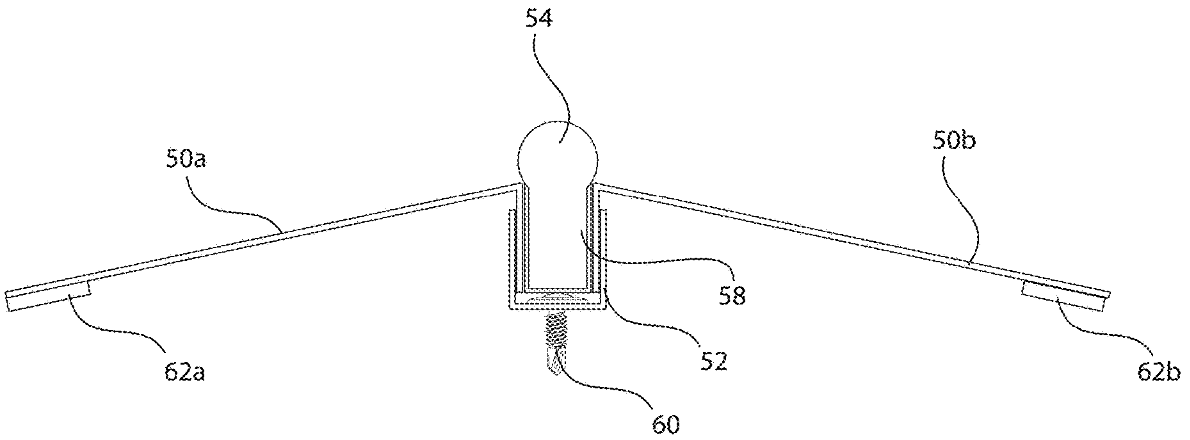
FIG. 9 is a cross-sectional view illustration of the riser assembly, according to one embodiment of the present invention.

In the depicted configuration, riser stripe 50 includes one or more decorative channel faces 50*a*, 50*b* defining vertical tapers beginning from an exterior face of each vertical end of the riser panel 46, and extending distally outward toward a channel 58 extending vertically along a height of the riser stripe 50. Housed within the channel 58 is a riser illumination element 54, which may be composed of a similar type of lighting system (LED) as continuous illumination element 26, or any other type of lighting system. The riser illumination element 54 includes wiring 56 which extends out of a vertically-top end of the riser illumination element 54 at the vertically-top end of the riser stripe 50 and into electronics module 28 in the base 100. In other embodiments, as depicted in FIG. 8, two or more riser illumination elements 54*a* and 54*b* may be affixed in a desired predetermined contour or stylized configuration. These illumination elements, like illumination element 26, may also be configured to output various light colors, temperatures and luminescence levels, which may be similar thereto or entirely different depending on the desired configuration.

It should be noted that, as may be evidenced by the foregoing description and drawings, any fasteners, such as fasteners 40 and fasteners 60 utilized to assemble the valance and riser assemblies, are contained within an interior of the base 100, within an interior of or atop the outer shroud 200, and within an interior of the riser assembly. Accordingly, when viewed by individuals from a ground perspective when utilizing the fuel dispenser 300, no fastening hardware is noticeable nor apparent. Moreover, while many of the aforementioned modifications may be made or exist with respect to the present invention, such modifications are also considered to be made while refraining from displaying any outward fastening hardware or electronic circuitry to individual consumers.

It should be noted that, as used herein, the terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A valance lighting assembly for illuminating an area proximate to commercial equipment, the valance lighting assembly comprising:

a dispenser structure configured as a support substrate for receiving the valance lighting assembly;

a base including one or more base panels defining a two-dimensionally-enclosed frame structure, the base configured to be removably coupled to the dispenser structure;

a continuous illumination element coupled to and extending along a width of an exterior face of at least some of the one or more base panels in a predetermined contour; and an outer shroud including one or more valance panels arranged to partially cover the base by extending longitudinally parallel to the at least some of the one or more base panels at a predetermined offset depth from the exterior face, thereby creating a cavity between the exterior face and the one or more valance panels, wherein a line defining a first end of the one or more valance panels follows a shape of the predetermined contour, and wherein the continuous illumination element is recessed within the cavity and utilizes the exterior face of the at least some of the one or more base panels to reflect light to the area proximate to the commercial equipment.

2. The valance lighting assembly of claim 1, wherein the dispenser structure comprises a preexisting dispenser bonnet positioned atop a fuel dispenser.

3. The valance lighting assembly of claim 1, wherein the one or more base panels comprise two symmetrically-opposed open-bracket-shaped panels.

4. The valance lighting assembly of claim 3, wherein each of the open-bracket-shaped panels are constructed from a singular section of material.

5. The valance lighting assembly of claim 4, wherein each end of each of the open-bracket-shaped panels further include a vertical flange extending inward toward an interior of the base.

6. The valance lighting assembly of claim 5, wherein the two open-bracket-shaped panels are affixed to one another in a clamshell configuration utilizing fasteners driven through the vertical flange of each open-bracket-shaped panel symmetrically opposing one another.

7. The valance lighting assembly of claim 1, wherein the two-dimensionally-enclosed frame structure comprises an open-box structure having a laterally-open top side and a laterally-open bottom side, thereby defining a vertical cavity through a height of the base.

8. The valance lighting assembly of claim 6, further comprising one or more cross-bars laterally affixed at predetermined width intervals between the two open-bracket-shaped panels to further couple the two open-bracket-shaped panels to one another and provide structural support to an interior thereof.

9. The valance lighting assembly of claim 8, further comprising one or more angle brackets horizontally affixed between the two open-bracket-shaped panels and extending downward at a predetermined angle to parallelly meet a top of the support substrate, wherein the base is mounted to the support substrate through fasteners coupling the angle brackets and the support substrate.

10. The valance lighting assembly of claim 1, further comprising lighting circuitry driving the continuous lighting element, wherein the lighting circuitry is contained within an electronics module disposed within the base.

11. The valance lighting assembly of claim 1, wherein a line defining a second end of the one or more valance panels follows a shape of a line defining a first end of the one or more base panels.

12. The valance lighting assembly of claim 1, wherein the one or more valance panels further comprise a mounting flap extending perpendicular from the second end of the one or more valance panels and laterally-inward toward an inner portion of the base.

13. The valance lighting assembly of claim 12, wherein the mounting flap is used to secure the one or more valance panels to the at least some of the one or more base panels utilizing one or more fasteners.

14. The valance lighting assembly of claim 1, wherein the predetermined offset depth comprises less than double a width of the continuous illumination element.

15. The valance lighting assembly of claim 1, wherein a lens of the continuous illumination element is one of curved and flat, and follows the predetermined contour.

16. The valance lighting assembly of claim 1, wherein any fasteners utilized to construct the valance lighting assembly and mount the valance lighting assembly to the commercial equipment are contained on an interior of the valance lighting assembly and hidden from an exterior perspective view.

17. The valance lighting assembly of claim 1, wherein each of the base and the outer shroud are constructed from a pliably rigid metal or metal alloy.

18. The valance lighting assembly of claim 1, wherein the illumination element comprises a flexible light-emitting diode (LED) Neon-style tube light, and wherein a color of light produced by the flexible LED Neon-style tube light is user-selected from a plurality of colors.

19. A lighting assembly for illuminating an area proximate to commercial equipment, the lighting assembly comprising:

a dispenser structure configured as a support substrate;

a valance lighting assembly comprising:

a base including one or more base panels defining a two-dimensionally-enclosed frame structure and configured to be removably coupled to the dispenser structure;

a continuous illumination element coupled to and extending along a width of an exterior face of at least some of the one or more base panels in a predetermined contour; and an outer shroud including one or more valance panels arranged to partially cover the base by extending longitudinally parallel to the at least some of the one or more base panels at a predetermined depth from the exterior face, thereby creating a cavity between the exterior face and the one or more valance panels, wherein a line defining a first end of the one or more valance panels follows a shape of the predetermined contour, and wherein the continuous illumination element is disposed within the cavity and utilizes the exterior face of the at least some of the one or more base panels to reflect light to the area proximate to the commercial equipment; and a riser assembly comprising:

one or more riser stripes affixed to an external side of one or more vertically-extending riser panels of the commercial equipment; and one or more riser illumination elements partially disposed within a channel formed vertically along a height of the one or more riser stripes, wherein a light-emitting portion of the one or more riser illumination elements partially protrudes above a face of the one or more riser stripes to omnidirectionally direct light to the area proximate the commercial equipment.

20. The lighting assembly of claim 19, wherein the one or more riser stripes each include a decorative channel face defining vertical tapers beginning from a face of each vertical end of the one or more vertically-extending riser panels and extending distally outward toward the channel.

* * * * *